(12) United States Patent  
Noorkami et al.

(10) Patent No.: US 12,301,825 B2
(45) Date of Patent: May 13, 2025

(54) RESOLUTION-BASED VIDEO ENCODING

(71) Applicant: Apple Inc., Cupertino, CA (US)

(72) Inventors: Maneli Noorkami, Menlo Park, CA (US); Afshin Taghavi Nasrabadi, Santa Clara, CA (US); Ranjit Desai, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 75 days.

(21) Appl. No.: 18/097,165

(22) Filed: Jan. 13, 2023

(65) Prior Publication Data

US 2023/0300338 A1 Sep. 21, 2023

Related U.S. Application Data

(60) Provisional application No. 63/320,552, filed on Mar. 16, 2022.

(51) Int. Cl.
| | |
|---|---|
| *H04N 19/136* | (2014.01) |
| *H04N 19/107* | (2014.01) |
| *H04N 19/119* | (2014.01) |
| *H04N 19/159* | (2014.01) |
| *H04N 19/172* | (2014.01) |
| *H04N 19/176* | (2014.01) |

(Continued)

(52) U.S. Cl.
CPC ......... *H04N 19/136* (2014.11); *H04N 19/107* (2014.11); *H04N 19/119* (2014.11); *H04N 19/159* (2014.11); *H04N 19/172* (2014.11); *H04N 19/176* (2014.11); *H04N 19/30* (2014.11); *H04N 19/50* (2014.11)

(58) Field of Classification Search
CPC ...... H04N 19/30; H04N 19/50; H04N 19/597; H04N 19/107; H04N 19/136; H04N 19/159

See application file for complete search history.

(56) References Cited

U.S. PATENT DOCUMENTS 6,252,989 B1 *  6/2001  Geisler .................. H04N 19/64
                                              375/E7.161
8,547,435 B2 * 10/2013  Mimar ................. G07C 5/0866
                                              348/148

(Continued)

FOREIGN PATENT DOCUMENTS

KR       101007381 B1    1/2011

OTHER PUBLICATIONS

Videoconferencing using spatially varying sensing with multiple moving foveae; Basu—1994; (Year: 1994).*

(Continued)

*Primary Examiner* — Luis Perez-Fuentes
(74) *Attorney, Agent, or Firm* — BAKERHOSTETLER

(57) ABSTRACT

Aspects of the subject technology relate to encoding of video frames having content with a variable resolution that varies within the video frame. Aspects of the subject technology can provide an efficient encoding by using smaller macroblocks for lower resolution content within the video frame, and larger macroblocks for higher resolution content within the video frame. An encoder may be provided with resolution information for the content of the video frame, which can be used by the encoder to determine macroblock sizes, macroblock divisions, and/or prediction modes for the encoding of the video frame.

26 Claims, 8 Drawing Sheets

(51) Int. Cl.
   *H04N 19/30* (2014.01)
   *H04N 19/50* (2014.01)

(56) References Cited

U.S. PATENT DOCUMENTS

| | | | | |
|---|---|---|---|---|
| 8,619,857 | B2* | 12/2013 | Zhao | H04N 19/152 |
| | | | | 375/E7.243 |
| 9,615,063 | B2* | 4/2017 | Tanaka | H04N 23/741 |
| 10,425,643 | B2* | 9/2019 | Shen | H04N 19/167 |
| 10,546,364 | B2* | 1/2020 | Bastani | G06T 19/00 |
| 10,798,306 | B1* | 10/2020 | Johansen | G06V 10/82 |
| 10,904,508 | B2 | 1/2021 | Zhou | |
| 10,997,693 | B2* | 5/2021 | Newman | H04N 23/698 |
| 11,792,381 | B2* | 10/2023 | Wang | H04N 13/254 |
| | | | | 348/162 |
| 2005/0018911 | A1* | 1/2005 | Deever | H04N 19/126 |
| | | | | 375/E7.14 |
| 2010/0086032 | A1 | 4/2010 | Chen et al. | |
| 2010/0215098 | A1 | 8/2010 | Chung | |
| 2011/0002391 | A1 | 1/2011 | Uslubas et al. | |
| 2012/0269274 | A1 | 10/2012 | Kim et al. | |
| 2013/0039415 | A1 | 2/2013 | Kim et al. | |
| 2014/0241421 | A1 | 8/2014 | Orton-Jay | |
| 2015/0063437 | A1 | 3/2015 | Murakami et al. | |
| 2016/0360209 | A1 | 12/2016 | Gosling et al. | |
| 2018/0174619 | A1* | 6/2018 | Roy | H04N 21/47217 |
| 2018/0220119 | A1 | 8/2018 | Horvitz et al. | |
| 2018/0288363 | A1* | 10/2018 | Amengual Galdon | H04N 19/40 |
| 2018/0343472 | A1* | 11/2018 | Wang | H04N 21/85406 |
| 2020/0288164 | A1 | 9/2020 | Lin et al. | |
| 2020/0366934 | A1 | 11/2020 | Edpalm et al. | |
| 2021/0136397 | A1 | 5/2021 | Lashmikantha et al. | |
| 2021/0142443 | A1 | 5/2021 | Eble et al. | |
| 2023/0350202 | A1* | 11/2023 | Mayrand | H04N 21/25858 |

OTHER PUBLICATIONS

Foveated video compression with optimal rate control; Lee—2001; (Year: 2001).*
Foveated Neural Network Gaze Prediction on Egocentric Videos; Zhang—2017; (Year: 2017).*
Visual pattern image sequence coding; Silsbee—1993; (Year: 1993).*
Exploring with a foveated robot eye system; Baron—1994; (Year: 1994).*
Videoconference using spatially varying sensing with multiple moving foveae; Basu—1994; (Year: 1994).*
PoLin Lai, et al., "Signalling of VR spatial relationship in MPD," International Organisation for Standardisation ISO/IEC JTC1/SC29/WG11 Coding of Moving Pictures and Audio, Oct. 2016, 15 pages.
International Search Report and Written Opinion from PCT/US2023/014753, dated Jul. 6, 2023, 17 pages.
Lee, et al., "Foveated Video Compression with Optimal Rate Control," IEEE Transactions on Image Processing, Jul. 2001, vol. 10, No. 7, pp. 977-992.

* cited by examiner

RESOLUTION-BASED VIDEO ENCODING

CROSS REFERENCE TO RELATED APPLICATIONS

This application claims the benefit of priority to U.S. Provisional Patent Application No. 63/320,552, entitled, "Resolution-Based Video Encoding", filed on Mar. 16, 2022, the disclosure of which is hereby incorporated herein in its entirety.

TECHNICAL FIELD

The present description relates generally to image encoding, including, for example, resolution-based video encoding.

BACKGROUND

Video data is often encoded for storage and/or for transmission between devices over network connections.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
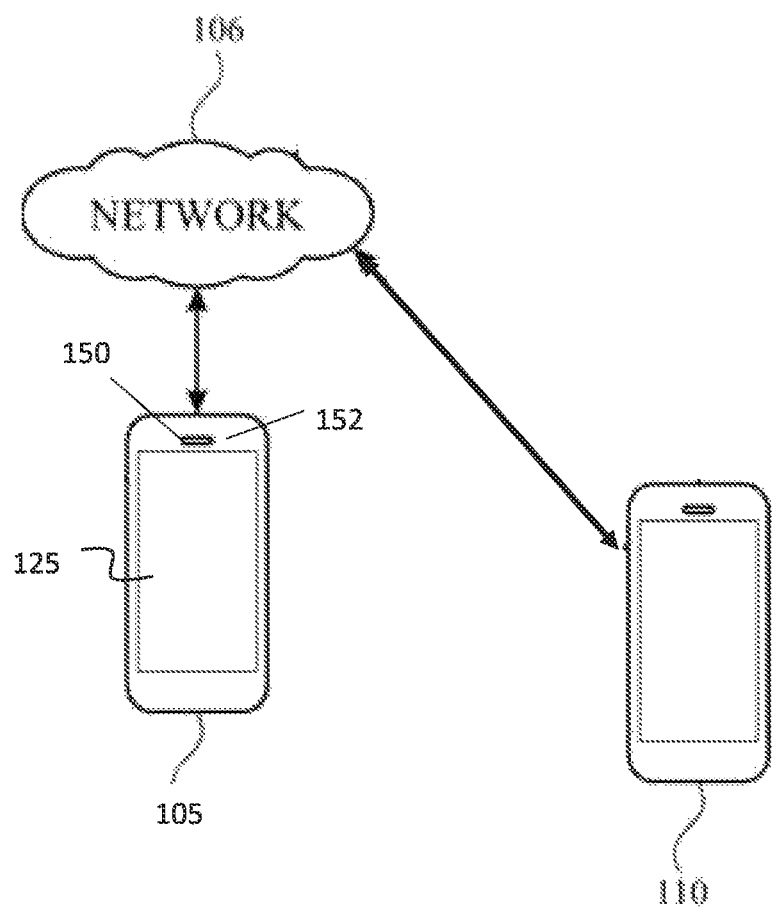
FIG. 1 illustrates an example system architecture including various electronic devices that may implement the subject technology in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

During encoding of images such as video frames, encoders apply video codecs that break each video frame into macroblocks. The encoders can also apply intra-frame or inter-frame prediction coding to each macroblock. The macroblocks can also be further divided into smaller blocks, such as transformation blocks.

As image sensors and displays evolve to obtain and display ever higher-resolution video frames, the largest size of the macroblocks supported in video coding standards increases as well. Video codec design may assume that the resolution of the content within each video frame is the same throughout the video frame, while determining macroblock sizes for the macroblocks for a video frame, determining divisions of the macroblocks, and determining prediction modes that provide a prediction match and reduce the residuals to achieve the highest compression under the same visual quality.

However, due, for example, to the projection format of a video frame or due to foveated rendering (e.g., to render a highest resolution content at the location of a viewer's gaze or at the location of certain content) of a video frame, the resolution of the content within a video frame can vary within the video frame. Video codecs that do not take into account the variable resolution of the content within a video frame in selecting a macroblock size, division, or prediction mode can result in an inefficient encoding of portions of a video frame. Moreover, encoders typically do not have a mechanism to pass resolution information to a decoder and/or a renderer.

Implementations of the subject technology described herein may provide efficient video encoding for video frames that have content with variable intra-frame resolution, such as foveated video frames, equirectangular projection video frames, fish-eye projection video frames, etc. The efficient video encoding can be provided by providing resolution information for the content of a video frame to an encoder, along with the video frame to be encoded. In some examples, the resolution information can be in the form of a resolution map (e.g., a foveation map) that indicates the resolution of the content of various portions of the video frame, or in the form of a projection indicator that indicates a projection type of the content of the video frame from which the encoder can determine the resolution of the content of the various portions of the video frame.

The encoder can use the resolution information to determine various macroblock sizes, macroblock divisions, and/or prediction modes for encoding the video frame. For example, the encoder can use the resolution information as prior information that helps the encoder to more efficiently converge to an optimal macroblock size, macroblock division, and prediction mode for each macroblock. For example, the encoder can determine that a particular macroblock size, macroblock division, prediction mode is optimal by determining that (in comparison with other macroblock sizes, macroblock divisions, and/or prediction modes) the particular macroblock size, macroblock division, and prediction mode results in a minimum residual relative to a reference block, and consequently a minimum bit rate. Using the resolution information to, for example, guide the initial selections of the macroblock sizes, macroblock divisions, and/or prediction modes can allow the encoder to more efficiently find the optimal cases, which can provide a more power efficient encoder. Moreover, in one or more use cases in which the resolution of the content of the video frames changes over time (e.g., due to a changing location of a foveated region in a gaze-based foveation), the resolution information can inform the encoder how to scale a current macroblock or subblock compared to the reference macroblock or subblock to calculate the residuals. In this way, providing the resolution information for a video frame to an encoder can help the encoder to optimally encode frames with temporally varying resolution. Efficiently encoding variable resolution frames in this way can further enhance the power efficiency of the encoder. It is also appreciated that the improved power efficiency provided by the resolution-based encoding described herein is not only improved in the encoder. For example, the resolution-based encoding described herein can also reduce the overall encoded pixels and bit rates, and thus also save power on the decoder side. This can be beneficial for any device that consumes power including, for example, devices for which power is constrained.

The encoder can encode a resolution factor (e.g., a foveation factor) for each macroblock in a resolution-based encoded video stream, to be used by a decoder for decoding the resolution-based encoded video stream.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture of FIG. 1 includes an electronic device 105 and an electronic device 110. For explanatory purposes, the system architecture is illustrated in FIG. 1 as including the electronic device 105 and the electronic device 110; however, the system architecture may include any number of electronic devices and any number of servers or a data center including multiple servers.

The electronic device 105 may be smartphone, a tablet device, or a wearable device such as a smart watch or head mountable portable system. The electronic device 105 may include a display system capable of presenting images, such as video images, to a user (e.g., by rendering and displaying a series of video frames). The electronic device 105 may be powered with a battery and/or any other power supply. In one or more implementations, electronic device 105 may be a handheld electronic device, such as a tablet, mobile device, or the like.

The electronic device 105 may include one or more cameras such as camera(s) 150 (e.g., visible light cameras, infrared cameras, eye tracking cameras, etc.) Further, the electronic device 105 may include various sensors such as sensor(s) 152 including, but not limited to, cameras, image sensors, touch sensors, microphones, inertial measurement units (IMU), heart rate sensors, temperature sensors, Lidar sensors, radar sensors, sonar sensors, GPS sensors, Wi-Fi sensors, near-field communications sensors, etc.) Moreover, the electronic device 105 may include hardware elements that can receive user input such as touch elements of a touchscreen, hardware buttons or switches. User input detected by such sensors and/or hardware elements may correspond to various input modalities for initiating recording of video content using camera(s) 150, and/or for storing and/or transmitting a video stream to the electronic device 110 (e.g., directly or via a network such as network 106). In one or more implementations, one or more of camera(s) 150 and/or sensor(s) 152 may be used for eye tracking (e.g., gaze direction or gaze location tracking). For example, video recorded by one or more other camera(s) 150 may include foveated video in which a portion of the video frame at the gaze location on which the user is gazing is obtained and/or recorded with a higher resolution that the resolution of other portions of the video frame. In one or more implementations, the electronic device 105 may include an encoder that generates a resolution-based encoded video stream by encoding video frames, such as foveated video frames, having content with a variable resolution that varies within the video frame. Other examples of video frames having content with a variable resolution that varies within the video frame are described herein.

The network 106 may communicatively (directly or indirectly) couple, for example, the electronic device 105 and the electronic device 110, and/or one or more electronic devices of one or more other users. In one or more implementations, the network 106 may be an interconnected network of devices that may include, or may be communicatively coupled to, the Internet.

The electronic device 110 may include a touchscreen and may be, for example, a smartphone, a portable computing device such as a laptop computer, a peripheral device (e.g., a digital camera, headphones), a tablet device, a wearable device that includes a touchscreen such as a watch, a band, and the like, any other appropriate device that includes, for example, a touchscreen, a memory, and/or one or more processors. In FIG. 1, by way of example, the electronic device 110 is depicted as a mobile smartphone device with a touchscreen. In one or more implementations, the electronic device 110 and/or the electronic device 105 may be, and/or may include all or part of, the electronic system discussed below with respect to FIG. 9.

In one or more implementations, the electronic device 105 may encode a series of video frames, each having content with a variable resolution that varies within the video frame, into a resolution-based encoded video stream. In one or more implementations, the electronic device 105 may transmit the resolution-based encoded video stream to another electronic device, such as the electronic device 110. In one or more implementations, the electronic device 110 may include a decoder that decodes a resolution-based encoded video stream to generate video frames (e.g., for display at the electronic device 110). The decoder may use resolution information, such as one or more scaling factor, included in the resolution-based encoded video stream, to decode the resolution-based encoded video stream.

Figure 2:
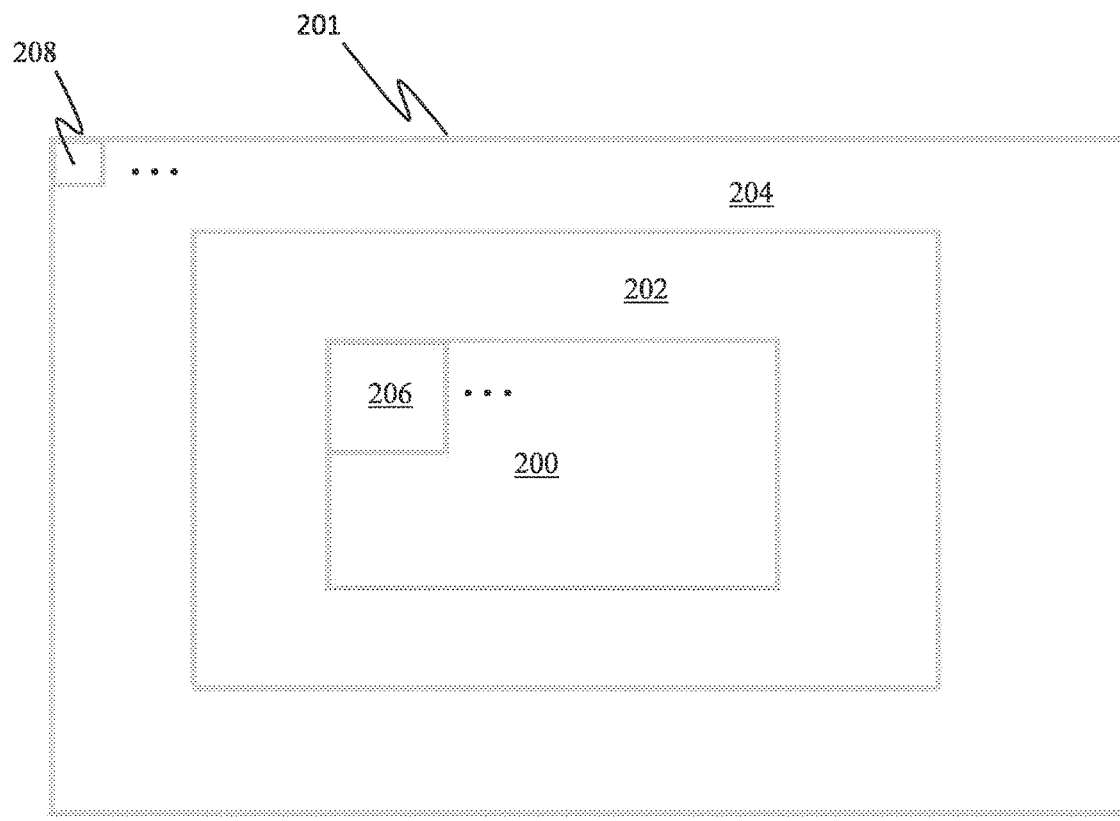
FIG. 2 illustrates example of a video frame having content with a variable resolution that varies within the video frame in accordance with one or more implementations.

FIG. 2 illustrates an example of a video frame having content with a variable resolution that varies within the video frame. In the example of FIG. 2, a video frame 201 may be single image or a single image frame or a series of image frames that, when displayed sequentially at a video frame rate, generate a video output on a display of a device, such as the electronic device 105.

In one or more implementations, the video frame 201 may have a pixel resolution that indicates the number and/or density of pixels of the video frame 201. As examples, the video frame 201 may be a 4K video frame having 3840× 2160 pixels, a 1080p video frame having 1920×1080 pixels, or a video frame having any other pixel resolution. In a particular video recording, and/or video stream, all of the video frames may have the same pixel resolution. However, in various use cases, the content that is stored in, for example, the 3840×2160 pixels of a 4K video frame may have a resolution that varies across the content.

In the example of FIG. 2, the content of the video frame 201 includes content in three regions with three different content resolutions. In this example, the content of the video frame 201 has a first content resolution in a first portion (e.g., portion 200) of the video frame 201 (e.g., a first portion corresponding to a first set of pixels of the video frame, such as a central rectangular region of the pixels of the video frame), a second content resolution in a second portion (e.g., portion 202) of the video frame 201 (e.g., a second portion corresponding to a second set of pixels of the video frame, such as a set of pixels in a first rectangular annulus around a central rectangular region of the pixels of the video frame), and a third content resolution in a third portion (e.g., portion 204) of the video frame 201 (e.g., a third portion corresponding to a third set of pixels of the video frame, such as second rectangular annulus a first rectangular annulus of pixels of the video frame).

For example, in one illustrative use case, the content in the portion 200 may have a higher content resolution (e.g., twice the content resolution) of the content in the portion 202, and the content in the portion 202 may have a higher content resolution (e.g., twice the content resolution) of the content in the portion 204. In this example, the video frame 201 may be a foveated video frame in which the content at and around the center of the video frame 201 (e.g., wherein a viewer is most likely to look) is presented (e.g., rendered and/or displayed) at a higher content resolution than the content in the outer regions of the video frame (e.g., which may be viewed by the peripheral portions of the viewer's vision in some use cases).

In one or more implementations, an encoder may be provided with resolution information (e.g., foveation information, in this example), that indicates the absolute or relative content resolutions of the content each of the portions 200, 202, and 204. In one or more implementations, the resolution information may be a resolution factor for each of the portions 200, 202, and 204 (e.g., a resolution factor of one for the portion 200, a resolution factor of M for the portion 202, and resolution factor of N for the portion 204, indicating that the resolution of content in the portion 200 is M times the resolution of the content in the portion 202 and N times the resolution of content in the portion 204), or may be provided in resolution map having pixels that are pixel aligned with the smallest macroblock size of the supported macroblocks for the video frame 201 and that indicate the resolution of the content of corresponding pixels of the video frame 201 (as examples). In one or more implementations, the resolution information may be provided with the video frame 201 (e.g., a metadata of the video frame 201, or as companion data, such as a resolution map). In other implementations, the resolution information may be derived from the content of the video frame 201 itself.

The encoder may use the resolution information to select the macroblock size, macroblock division, and/or prediction mode for encoding the video frame 201. For example, as indicated in FIG. 2, a relatively larger macroblock size (e.g., a 64×64 pixel macroblock size) may be selected for the macroblocks 206 of the portion 200, than the macroblock size (e.g., a 16×16 pixel macroblock size) of the macroblocks 208 of the portion 204 of the video frame 201. Similarly, a macroblock size for the macroblocks of the portion 202 of the video frame may be an intermediate macroblock size (e.g., 32×32 pixels) between the macroblock size of the macroblocks 206 and the macroblock size of the macroblocks 208.

In one or more implementations, the encoder may include the resolution factor for each macroblock in an outgoing video stream (e.g., with the corresponding encoded macroblock), to form a resolution-based encoded video stream. A decoder that receives the resolution-based encoded video stream may use the resolution factors in the resolution-based encoded video stream to decode the macroblocks in that stream, to regenerate the video frame 201 (e.g., and other video frames in the stream).

In the example of FIG. 2, the portions 200, 202, and 204 of the video frame 201 are concentric rectilinear portions. However, this is merely illustrative, and the video frame 201 may include content having a resolution that varies, within the video frame, in other ways, and in ways that may be static across multiple video frames, and/or that varies from video frame to video frame.

Figure 3:
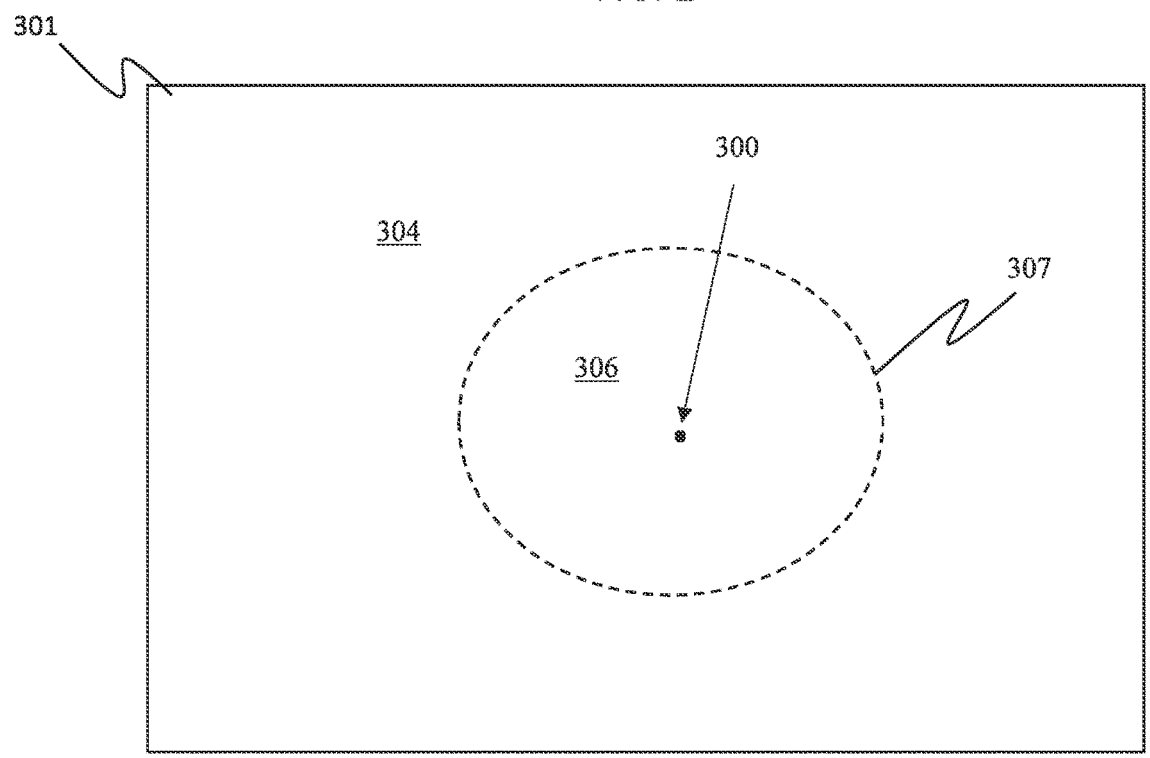
FIG. 3 illustrates example of a gaze-based foveated video frame in accordance with one or more implementations.

For example, FIG. 3, illustrates an example use case in which the video frame 301 is a gaze-based foveated video frame. In this example, a portion 306 of the video frame 301 has a content resolution that is higher than the content resolution in a portion 304 outside of a boundary 307 of the portion 306. In this example, the portion 306 of the video frame 301 is centered on a gaze location 300. For example, the gaze location 300 may be a location at which a user of the electronic device 105 is gazing at the time the video frame 301 is captured and/or displayed.

For example, images captured by camera(s) 150 and/or sensor data captured by sensor(s) 152 may be used (e.g., by a system process at the electronic device 105) to determine the gaze location 300 (e.g., in terms of the coordinates of a pixel or group of pixels of the display 125). For example, the images may include optical and/or infrared images of one or both eyes of the user.

In the example of FIG. 3, the video frame 301 is a gaze-based foveated display frame in which the content in the portion 306 of the video frame 301 that is within a predefined distance from the gaze location 300 (e.g., within a boundary 307) is displayed with a first content resolution, and the content in the portion 304 of the video frame 301 that is outside the predefined distance (e.g., outside the boundary 307) is displayed with a second, lower content resolution. In this way, the gaze location 300, can be used to save power and/or processing resources of the electronic device 105, by allowing pixels in the portion 304 to be rendered at a lower resolution, when the user is not gazing on that location.

In the example of FIG. 3, the boundary 307 is indicated by a dashed line. However, this is merely for ease of understanding of this discussion, and it is appreciated that the boundary 307 between the portion 306 (e.g., the high resolution portion) and the portion 304 (e.g., the low resolution portion) of the video frame 301 may be constructed so as to be imperceptible by a viewer. For example, the boundary 307 may have a radial or other width and may have a resolution that decreases across the width from the resolution of the portion 306 (e.g., a content resolution at an outer edge of the portion 306) to the resolution of the portion 304 (e.g., a content resolution at an inner edge of the portion 304), to create a smooth transition that is imperceptible by the viewer. Moreover, the boundary 307 of FIG. 3 is depicted as a rounded boundary, but may be implemented with other forms and/or shapes in various implementations. Further, the resolution of the portion 306 and/or the resolution of the portion 304 may also be varied, from video frame to video frame, as a function of distance from the gaze location 300 and/or as a function of the displayed content.

In one or more implementations, as the gaze location 300 moves, the electronic device 105 may track and update the locations and/or shapes of the portion 306 and the portion 304 to continue to be substantially centered on the gaze location 300. Because the high content resolution portion of a gaze-based foveated video frame changes from frame to frame, an encoder encoding a gaze-based foveated video frame may determine, based on resolution information for the gaze-based foveated video frame, that an intra-frame prediction mode is to be used for the encoding of the gaze-based foveated video frame (e.g., rather than an inter-frame prediction mode), and/or the encoder can use the resolution information to provide temporal foveation hints to allow proper scaling of macroblocks in an inter-frame prediction mode. For example, the resolution information that is provided to the encoder may include a gaze-based frame indicator that indicates the video frame to be encoded is a gaze-based foveated video frame. In another example, the encoder may determine that resolution information for adjacent display frames indicates that relatively high and relatively lower content resolution portions of adjacent display frames are changing from frame to frame, and thus determine that the video frame to be encoded is a gaze-based foveated video frame. As in the example of FIG. 2 the resolution information may be provided to an encoder, in the form of a resolution factor for each of the portions 304 and 306 or in the form of a resolution map (e.g., a foveation map). Resolution factors for the macroblocks each of the portions 304 and 306 may also be encoded into a resolution-based encoded video stream including the video frame 301.

Figure 4:
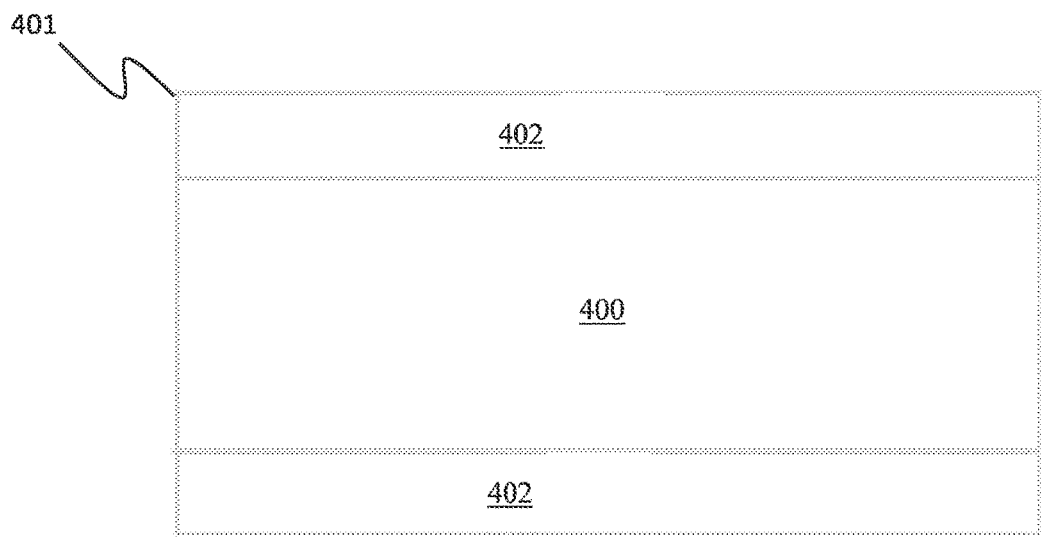
FIG. 4 illustrates an example of an equirectangular projection video frame in accordance with one or more implementations.

FIG. 4 illustrates another example of a video frame having content with a variable resolution that varies within the video frame. In this example, the video frame 401 is an equirectangular projection video frame in which content in the pole portions 402 of the video frame 401 are stretched with respect to content in the equatorial portion 400 of the video frame. In this example, an encoder can downsample/decimate the macroblocks for the pole portions 402 before encoding the video frame 401. As in the examples of FIGS. 2 and 3, the encoder may use resolution information indicating the (e.g., absolute or relative) resolutions of the pole portions 402 and the equatorial portion 400 to select the macroblock size, macroblock division and prediction mode for encoding the video frame 401. For example, a smaller macroblock size may be selected for the macroblocks for the pole portions 402 and a relatively larger macroblock size may be selected for the macroblocks for the for equatorial portion 400.

In this example, the resolution information may be provided as resolution factors for each of the pole portions 402 and the equatorial portion 400, as a resolution map, or as a projection indicator indicating the equirectangular projection of the video frame 401. For example, the projection indicator may be or include a flag or other parameter or information that indicates the equirectangular projection of the video frame 401 to the encoder. In this example, the encoder may store one or more projections (e.g., code for a parametrized equation of each of one or more projections), including the equirectangular projection, and may compute the resolution of various portions of the video frame 401 (e.g., the pole portions 402 and the equatorial portion 400) using the stored projection indicated by the projection indicator (e.g., and using one or more parameters provided in the projection indicator).

In one or more implementations, a resolution factor for each macroblock may be passed (e.g., in a resolution-based encoded video stream) to a decoder as a scaling factor for that macroblock. The decoder may then scale the macroblocks, after decoding using the scaling factors, to construct the video frame 401.

Figure 5:
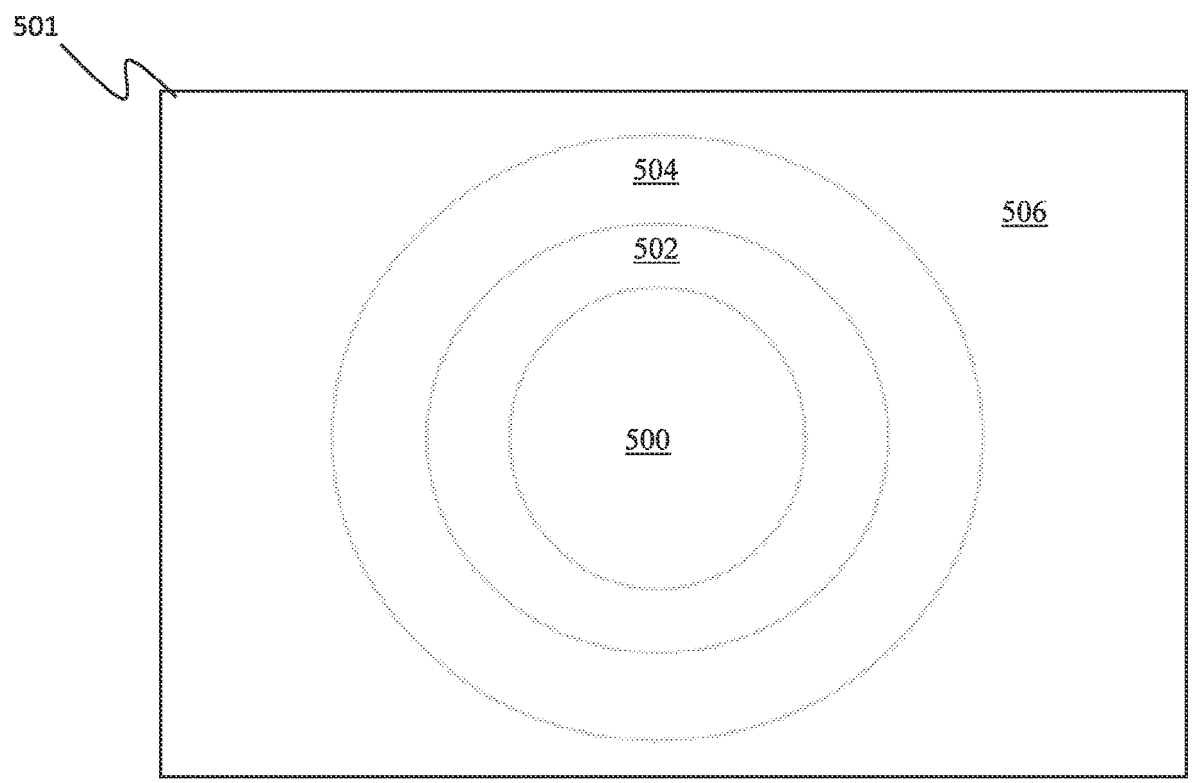
FIG. 5 illustrates an example of a fisheye projection video frame in accordance with one or more implementations.

FIG. 5 illustrates another example of a video frame having content with a variable resolution that varies within the video frame. In this example, the video frame 501 is a fisheye projection video frame in which the content in a central portion 500 has a content resolution that is higher than the content resolution of the content in a portion 502, which is higher than the content resolution of the content in a portion 504, which is higher than the content resolution of the content in a portion 506. For example, the video frame 501 may have been captured with a camera having a fisheye lens (e.g., a FsinTheta space), or may have been digitally warped to appear as though captured using a fisheye lens.

As in the examples of FIGS. 2-4, the encoder may use resolution information indicating the (e.g., absolute or relative) resolutions of the central portion 500 and the portions 502, 504, and 506, to select the macroblock size, macroblock division and prediction mode for encoding the video frame 501. For example, a larger macroblock size may be selected for the macroblocks for the central portion 500 and relatively (e.g., progressively) smaller macroblock sizes may be selected for the macroblocks for the portions 502, 504, and 506. In this example, the resolution information may be provided as resolution factors for each of the central portion 500 and the portions 502, 504, and 506, as a resolution map, or as a projection indicator indicating the fisheye projection of the video frame 501 (e.g., including one or more parameters of the fisheye projection of the video frame 501). For example, the projection indicator may be or include a flag or other parameter or information that indicates the fisheye projection of the video frame 501 to the encoder. In this example, the encoder may store the fisheye projection, and may compute the resolution of various portions of the video frame 501 (e.g., the central portion 500 and the portions 502, 504, and 506) using the stored projection indicated by the projection indicator (e.g., and using one or more parameters provided in the projection indicator).

In one or more implementations, a resolution factor for each macroblock may be passed (e.g., in an encoded video stream) to a decoder as a scaling factor for the macroblock. The decoder may then scale the macroblocks, after decoding and using the scaling factors, to construct the video frame 501. In one or more implementations, the scaling factors provided in the encoded video stream may be the same as the resolution factors received by the encoder, or may be different and derived from (e.g., by the encoder) the resolution factors.

Figure 6:
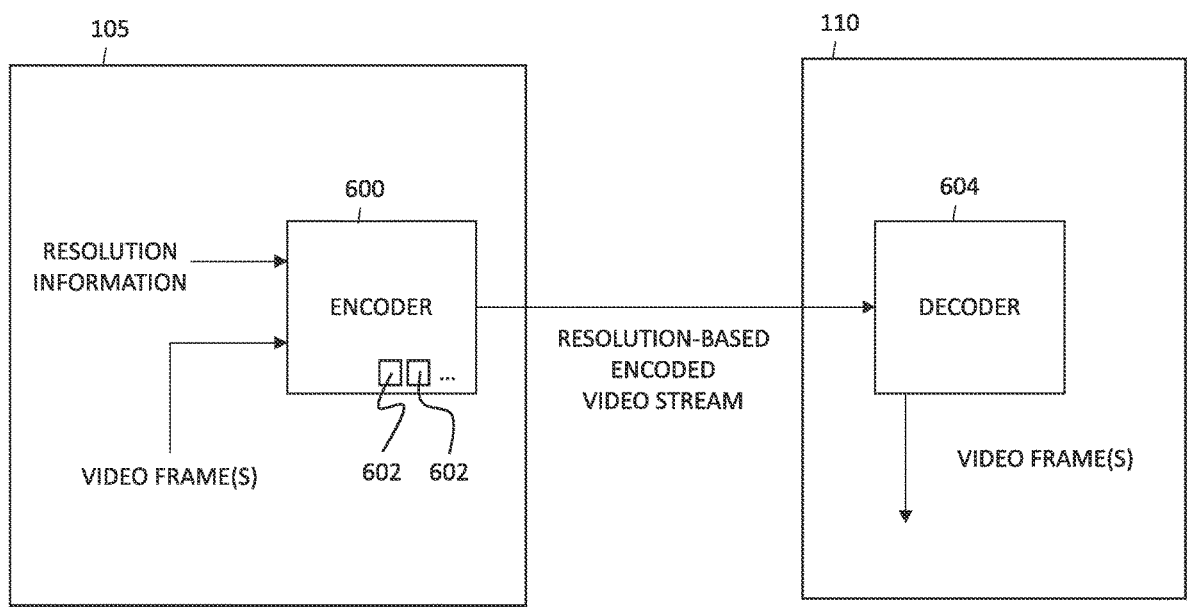
FIG. 6 illustrates an example architecture of an electronic device that may implement aspects of the subject technology in accordance with one or more implementations.

FIG. 6 illustrates an example architecture that may be implemented by the electronic device 105 and the electronic device 110 in accordance with one or more implementations of the subject technology. For explanatory purposes, portions of the architecture of FIG. 6 are described as being implemented by the electronic device 105 of FIG. 1; however, appropriate portions of the architecture may be implemented by any other electronic device having memory and one or more processors. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Various portions of the architecture of FIG. 6 can be implemented in software or hardware, including by one or more processors and a memory device containing instructions, which when executed by the processor cause the processor to perform the operations described herein.

The example of FIG. 6 illustrates the electronic device 105 operating to encode video frame(s) using resolution information for the video frame(s). As shown, the video frame(s) and the resolution information may be provided, as inputs, to an encoder 600. For example, one or more of the video frame(s) may have content with a variable resolution that varies within the video frame. As examples, one or more of the video frames may be foveated video frames (e.g., including a video frame 201 and/or a video frame 301), equirectangular video frames (e.g., including a video frame 401), or fisheye video frames (e.g., including a video frame 501).

In various use cases, the video frame(s) may be generated by the electronic device 105 (e.g., using camera(s) 150 and/or a video editing application) or the video frame(s) may be obtained from a remote device or system (e.g., by downloading or streaming the video frame(s) to the electronic device).

In various implementations, the resolution information may be explicit resolution information that directly indicates the resolutions of the content in various respective portions of a video frame (e.g., resolution factors or values for each of multiple groups of pixels or each pixel of the video frame), or the resolution information may be implicit resolution information from which the absolute and/or relative content resolutions of the content in various respective portions of a video frame can be derived. An example of explicit resolution information includes a resolution map with resolution pixels having content resolution values (e.g., absolute resolution values or relative resolution factors) and corresponding to pixels of the video frame.

An example of implicit resolution information includes a projection indicator that the encoder 600 can use to compute the resolutions of the content in various respective portions of a video frame. For example, in one or more implementations, the encoder 600 may store one or more projections 602. Each of the projections 602 may include code for computing a particular mathematical projection, such as an equirectangular projection, or a fisheye projection. In one or more implementations, the resolution information that is provided to the encoder may include a projection indicator that indicates which of the projections 602 is to be used by the encoder 600 to compute the content resolutions of various portions of a video frame.

In one or more implementations, the projection indicator may include one or more parameters of a selected projection 602, that allow the projection 602 to be used by the encoder 600 to compute a particular projection for a particular video frame. For example, a projection indicator may indicate an equirectangular projection of a video frame (e.g., indicating generally that the video frame has a lower content resolution at or near the poles of the frame than at or near the equator of the frame), and may include parameters that control where in the video frame and/or a rate at which the content resolution decreases, in a direction from the equator of the video frame toward the poles of the video frame. As another example, a projection indicator may indicate a fisheye projection of a video frame (e.g., indicating generally that the video frame has a higher content resolution at or near a center of the frame than at or near the outer regions of the frame), and may include parameters that control a rate at which the content resolution decreases in a direction radially outward from the center of the video frame.

In various implementations, the resolution information (e.g., explicit or implicit resolution information) may be provided with the video frame(s) from the source that generated the video frame(s), such as in metadata of the video frame(s) and/or a companion resolution map provided with the video frame(s), or the resolution information can be determined from the video frames. In one or more implementations, the encoder 600 may determine, based on the content of a video frame itself, that the video frame includes various portions with various different content resolutions.

The encoder 600 may encode the video frame(s) based on the resolution information. As examples, the encoder 600 may determine various different macroblock sizes (e.g., 64×64 pixels, 32×32 pixels, 16×16 pixels, or 8×8 pixels) of various different macroblocks for encoding each video frame, based on various different content resolutions of the content within that video frame. For example, the encoder 600 may determine a relatively larger macroblock size for a macroblock 206 of a portion 200 of the video frame 201 of FIG. 2, and may determine a relatively smaller macroblock size for a macroblock 208 of a portion 204 of the video frame 201, when the resolution information indicates that the content in the portion 200 has a higher resolution than the content in the portion 204.

In one or more implementations, the encoder 600 may also determine how to divide each macroblock (e.g., into transform blocks and/or prediction blocks) based on the resolution information. For example, the encoder 600 may determine a number of transform blocks and/or a size of the transform blocks, and/or a number of prediction blocks and/or a size of the prediction blocks for each macroblock based on the resolution information for that macroblock. In one or more implementations, the encoder 600 may also determine whether intra-frame prediction or inter-frame prediction is selected for a macroblock, based on the resolution information. In one or more implementations, once the encoder 600 has determined the macroblock sizes, the macroblock divisions, and/or the prediction modes using the resolution information, the encoder 600 may encode the macroblocks (e.g., by performing one or more transform operations, motion detection operations, prediction operations, etc.) into encoding units that include transform coefficients, motion vectors, quantization information, prediction information, partitioning information, resolution information (e.g., resolution factors such as scaling factors for the macroblocks), and/or other information for decoding the encoded unit(s). As shown in FIG. 6, the encoder may output the encoded units as a resolution-based encoded video stream.

As illustrated in FIG. 6, in one or more use cases, the electronic device 105 may provide (e.g., transmit) the resolution-based encoded video stream from the encoder 600 to another electronic device, such as the electronic device 110. As shown, the electronic device 110 may include a decoder 604. The electronic device 110 may provide the resolution-based encoded video stream (e.g., including multiple encoded macroblocks for a video frame and multiple respective resolution factors for the multiple macroblocks) to the decoder 604.

The decoder 604 may decode the resolution-based encoded video stream, using the multiple respective resolution factors received in the resolution-based encoded video stream, to generate the video frame. For example, the decoder 604 may decode the encoded macroblocks, and then scale the macroblocks after decoding to generate the video frame(s). In various use cases, the electronic device 110 may render, display, and/or store the decoded video frame(s).

In the example of FIG. 6, the resolution-based encoded video stream is transmitted from the electronic device 105 to the electronic device 110, and decoded at the electronic device 110. However, it is also appreciated that the resolution-based encoded video stream may also, or alternatively, be stored at the electronic device 105 (e.g., and later decoded at the electronic device 105, such as for later display on the display 125 of the electronic device 105).

Figure 7:
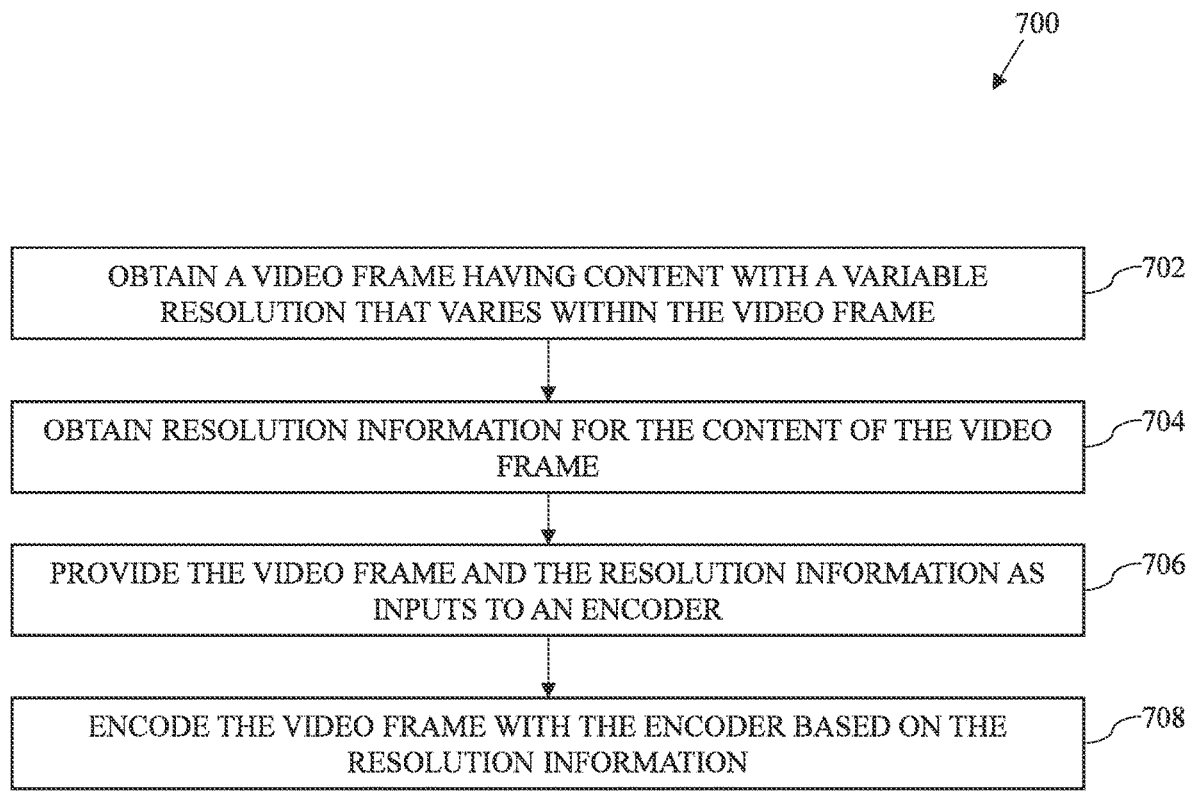
FIG. 7 illustrates a flow diagram of an example process for resolution-based encoding of video frames according to aspects of the subject technology.

FIG. 7 illustrates a flow diagram of an example process for encoding a video frame according to aspects of the subject technology. The blocks of process 700 are described herein as occurring in serial, or linearly. However, multiple blocks of process 700 may occur in parallel. In addition, the blocks of process 700 need not be performed in the order shown and/or one or more blocks of process 700 need not be performed and/or can be replaced by other operations.

In the example of FIG. 7, at block 702, a video frame having content with a variable resolution that varies within the video frame may be obtained (e.g., by an electronic device, such as the electronic device 105). In various uses cases, the video frame may be obtained by capturing the video frame with a camera (e.g., camera(s) 150) of an electronic device, or the video frame may be obtained from a video file stored at the electronic device or streamed or downloaded to the electronic device from a remote source (e.g., another electronic device, a server, or the like). As examples, the video frame may be one of a foveated video frame (e.g., as described herein in connection with FIGS. 2 and 3), an equirectangular projection video frame (e.g., as described herein in connection with FIG. 4), a fisheye projection video frame (e.g., as described herein in connection with FIG. 5), or any other video frame having content with a variable content resolution that varies within the video frame.

At block 704, resolution information may be obtained for the video frame. In various use cases, the resolution information may be included (e.g., as metadata) with the video frame and obtained therefrom, or the resolution information may be obtained by inferring or deriving the resolution information from the video frame. In one or more use cases, the resolution information may include a resolution map for the content of the video frame. A resolution map may include a content resolution of the content of each of the pixels in the video frame. In one or more other use cases, the resolution information may include resolution factors for various portions of the video frame. In one or more other use cases, the resolution information may include a projection indicator for the video frame. For example, the projection indicator may include a parameter that indicates a projection type of the content of the video frame. As examples, projections types may include an equirectangular projection or a fisheye projection. For example, a fisheye projection video frame (e.g., video frame 501 of FIG. 5) may be a video frame captured with a camera having a fisheye lens (e.g., an ultra-wide-angle lens that causes visual distortion and reduced resolution at the outer regions of an image), or a video frame modified to appear as though captured through a fisheye lens. In one or more implementations, the projection indicator may include one or more additional parameters that can be used in a stored projection 602, to perform a projection computation to compute the content resolution for the content in various portions of the video frame.

At block 706, the video frame and the resolution information may be provided, as inputs, to an encoder (e.g., an encoder 600 at the electronic device 105, such as at the electronic device that obtained the video frame and the resolution information for the video frame).

At block 708, the video frame may be encoded, with the encoder, based on the resolution information. In one or more implementations, encoding the video frame with the encoder based on the resolution information may include determining, by the encoder, a plurality of resolution factors for the content of a respective plurality of portions of the video frame based on the projection indicator and based on previously stored projection information (e.g., projections 602) for the projection indicator.

In one or more implementations, encoding the video frame with the encoder based on the resolution information may include obtaining a first resolution factor for the content of a first portion of the video frame portion (e.g., a portion 200, a portion 306, an equatorial portion 400, or a central portion 500) based on the resolution information; determining a first macroblock size of at least one macroblock for the first portion of the video frame based on the first resolution factor; obtaining a second resolution factor for the content of a second portion of the video frame portion (e.g., a portion 202, a portion 204, a portion 304, a pole portion 402, a portion 502, a portion 504, or a portion 506) based on the resolution information; and determining a second macroblock size, different from the first macroblock size, of at least one macroblock for the second portion of the video frame based on the second resolution factor. For example, a resolution factor may be a factor that indicates the relative content resolution of the content in one portion of a video frame relative to the content resolution of the content in another portion of the same video frame. For example, a resolution factor of one may indicate a maximum content resolution of a maximum resolution portion of a video frame (e.g., a portion in which the content resolution is the same as the pixel resolution of the video frame), and a resolution factor of four for another portion of the video frame has a content resolution that is four times lower than the maximum content resolution. In one or more implementations, encoding the video frame based on the resolution information may include determining one or more additional macroblock sizes for one or more additional macroblocks for the first portion of the video frame based on the first resolution factor. The one or more additional macroblock sizes for the first portion may be the same as, or different from the first macroblock size. In one or more implementations, encoding the video frame based on the resolution information may include determining one or more additional macroblock sizes for one or more additional macroblocks for the second portion of the video frame based on the second resolution factor. The one or more additional macroblock sizes for the second portion may be the same as, or different from, the second macroblock size. As discussed herein, the encoder can determine the macroblock sizes more efficiently using the resolution information.

In one or more implementations, encoding the video frame with the encoder based on the resolution information may also include generating a resolution-based encoded video stream that includes the first resolution factor, an encoded version of the at least one macroblock for the first portion of the video frame, the second resolution factor, and an encoded version of the at least one macroblock for the second portion of the video frame. The encoded versions of the macroblocks may include transformed, motion estimated, and/or predicted information for each macroblock, as generated by an encoder that generated the resolution-based encoded video frame.

In one or more implementations, encoding the video frame with the encoder based on the resolution information may also include dividing the at least one macroblock (e.g., into one or more transform blocks and/or one or more prediction blocks) for the first portion of the video frame (e.g., and/or for macroblocks for one or more other portions of the vide frame) based on the resolution information. In one or more implementations, encoding the video frame with the encoder based on the resolution information may include determining a prediction mode (e.g., an intra-frame prediction mode or an inter-frame prediction mode) for the at least one macroblock for the first portion of the video frame (e.g., and/or for macroblocks for one or more other portions of the vide frame) based on the resolution information. For example, in one or more use cases, the video frame may be a gaze-based foveated video frame (e.g., the gaze-based foveated video frame such as the video frame 301 of FIG. 3), and determining the prediction mode may include selecting an intra-frame prediction mode for the at least one macroblock for the first portion of the video frame or may include using the resolution information to scale prediction blocks for calculating residuals in an inter-frame prediction mode. This can be particularly helpful, for example, in use cases in which the gaze location 300 and the corresponding high resolution region (e.g., portion 306) of the gaze-based foveated video frame moves from frame to frame, and one or more macroblocks are scaled using the corresponding foveation factor for those macroblocks for comparison with a reference block. This can help improve the efficiency of the encoder since the encoder can leverage the resolution information to find better matching blocks and thereby reduce the bit rate.

In one or more implementations, a resolution factor (e.g., a foveation factor) may be added to each macroblock of a video frame. The resolution factor can be passed from the source frame or can be calculated by the encoder. For example, in a use case in which the video frame is an equirectangular projected frame in which the content is stretched at the poles, the macroblocks at the poles can be decimated for encoding and transmission, and the resolution factor can be transmitted per macroblock to reconstruct the video frame at a decoder. In one or more implementations, the resolution information may be provided to the encoder in the form of a resolution map (e.g., a foveation map) for the video frame. The resolution map may be pixel aligned with the smallest macroblock size of supported macroblocks. As discussed herein in connection with various examples, the encoder may take into account the resolution map to select the macroblock size, macroblock division and prediction mode.

In one or more implementations, the encoder may select a relatively smaller macroblock size for portions of a video frame with a relatively lower content resolution and a relatively larger macroblock size for portions of the same video frame with relatively higher content resolutions. In various uses cases, the video frame itself may have content that has been decimated or downsampled, and/or the encoder can decimate or downsample macroblocks that have less detailed content such as, for example, a macroblock that covers a flat area of the video frame.

In one or more implementations, the encoder may encode the video frame with the encoder based on the resolution information by performing a power efficient optimization of a macroblock size, a macroblock division, and a prediction mode selection using the resolution information. For example, the power efficient optimization may include determining an initial macroblock size, an initial macroblock division, and/or an initial prediction mode based on the resolution information. This may enhance the efficiency of the optimization of the macroblock size, the macroblock division, and/or the prediction mode for use in the final encoding by choosing an initial macroblock size, an initial macroblock division, and/or an initial prediction mode that is closer to the final (e.g., optimized) macroblock size, macroblock division, and/or an initial prediction mode than would be possible without the prior knowledge of the resolution information.

In this way, the encoder can use the resolution information as prior information that helps the encoder to more efficiently converge to an optimal macroblock size, macroblock division, and prediction mode for each macroblock. For example, the encoder can determine that a particular macroblock size, macroblock division, and prediction mode is optimal by determining that (in comparison with other macroblock sizes, macroblock divisions, and/or prediction modes) the particular macroblock size, macroblock division, and prediction mode results in a minimum residual relative to a reference block, and consequently a minimum bit rate. Using the resolution information to, for example, guide the initial selections of the macroblock sizes, macroblock divisions, and/or prediction modes can allow the encoder to more efficiently find the optimal cases, which can provide a more power efficient encoder.

In one or more implementations, encoding the video frame based on the resolution information may include applying a weighted metric for evaluating the encoding/compression efficacy of a particular encoding. For example, the weighted metric may be a weighted signal-to-noise ratio (SNR) or a weighted peak SNR (PSNR), in which the weighting of the ratio is different in different regions of the video frame, according to the resolution information for the various regions of the video frame.

In one or more implementations, the variable resolution of the content of the video frame may be different from a variable resolution of content of a temporally adjacent video frame (e.g., a prior video frame). For example, the video frames may be gaze-based foveated video frames in which a relatively high resolution portion of the video frame moves, with a viewer's gaze, from frame to frame. In these implementations, the encoder may encode the video frame with the encoder based on the resolution information by scaling at least one macroblock for the video frame using the resolution information, for comparison of the scaled macroblock with a reference block. In this way, the resolution information can provide temporal foveation hints (e.g., based on a gaze vector) to help interframe prediction and smoother transitions.

Figure 8:
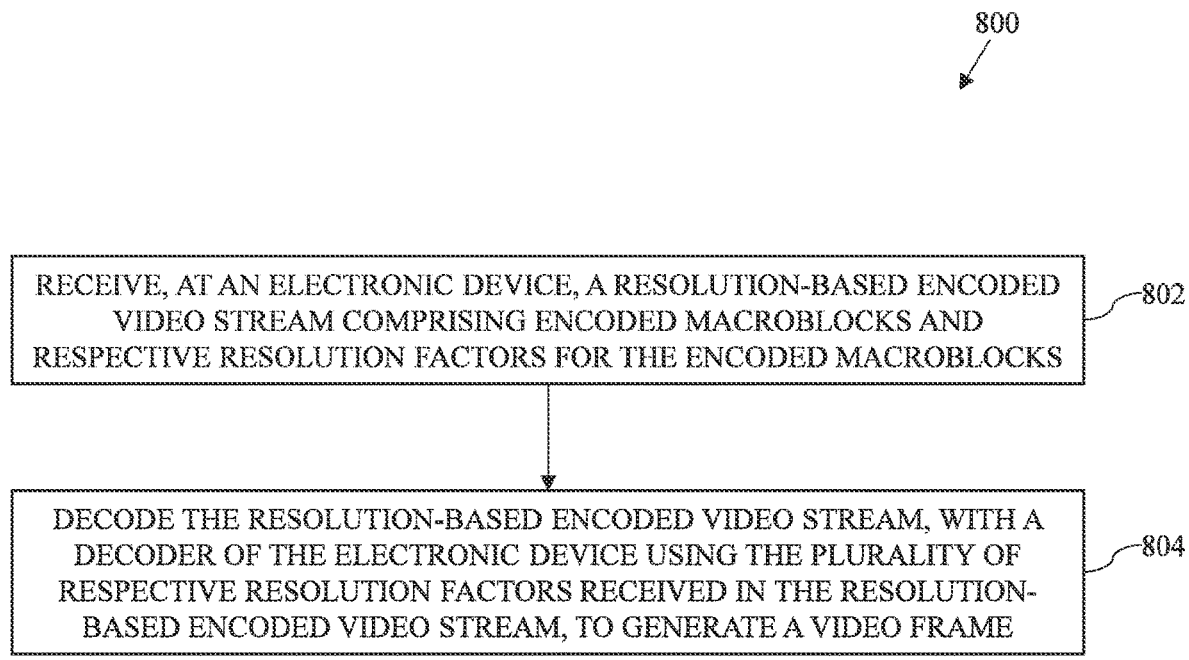
FIG. 8 illustrates a flow diagram of an example process for decoding a resolution-based encoded video stream according to aspects of the subject technology.

FIG. 8 illustrates a flow diagram of an example process for decoding a resolution-based encoded images, such as a resolution-based encoded video stream according to aspects of the subject technology. The blocks of process 800 are described herein as occurring in serial, or linearly. However, multiple blocks of process 800 may occur in parallel. In addition, the blocks of process 800 need not be performed in the order shown and/or one or more blocks of process 800 need not be performed and/or can be replaced by other operations.

In the example of FIG. 8, at block 802, an electronic device (e.g., electronic device 110) may receive a resolution-based encoded video stream that includes a plurality of encoded macroblocks for a video frame and a plurality of respective resolution factors for the plurality of encoded macroblocks. As examples, the video frame may be one of a foveated video frame (e.g., as described herein in connection with FIGS. 2 and 3), an equirectangular projection video frame (e.g., as described herein in connection with FIG. 4), a fish-eye projection video frame (e.g., as described herein in connection with FIG. 5), or any other video frame (e.g., a video frame having content with a variable resolution that varies within the video frame).

At block 804, the electronic device may decode the resolution-based encoded video stream, with a decoder (e.g., decoder 604) of the electronic device using the plurality of respective resolution factors received in the resolution-based encoded video stream, to generate a video frame. For example, decoding the resolution-based encoded video stream may include decoding a first one of the plurality of encoded macroblocks using a first respective one of the plurality of respective resolution factors to generate a first portion (e.g., a portion 200, a portion 306, an equatorial portion 400, or a central portion 500) of the variable-resolution video frame. Decoding the resolution-based encoded video stream may also include decoding a second one of the plurality of macroblocks using a second respective one of the plurality of respective resolution factors to generate a second portion (e.g., a portion 202, a portion 204, a portion 304, a pole portion 402, a portion 502, a portion 504, or a portion 506) of the variable-resolution video frame. For example, the decoder may decode the encoded macroblocks (e.g., by performing decoding operations such as parsing, entropy decoding, inverse transforms, spatial and/or temporal prediction, motion compensation, and/or deblocking operations) and then scale the decoded macroblocks using respective scaling factors for the decoded macroblocks (e.g., the decoded scaling factors included in the resolution-based encoded video stream). The decoder may decode and scale each of the encoded macroblocks of a video frame, using the resolution information for the macroblocks, and combine the decoded, scaled macroblocks to generate the video frame. In one or more implementations in which the video frame is a foveated video frame (e.g., video frame 201 of FIG. 2 or the gaze-based foveated video frame 301 of FIG. 3), the decoder can optionally scale the macroblocks before rendering, or can keep the macroblocks in a foveated mode and another entity in the system (e.g., a processing module in the display pipe before rendering on display) can unfoveate the video frames. In the examples of the equirectangular projection and/or the fisheye projection of FIGS. 4 and 5, in some implementations the video frames can be scaled be down during encoding and re-scaled by the decoder, or the resolution information can be used by the encoder only to help with the prediction efficiency.

In one or more implementations, first portion of the video frame may have a first resolution corresponding to the first respective one of the plurality of respective resolution factors, the second portion of the video frame may have a second resolution corresponding to the second one respective one of the plurality of respective resolution factors, and the first resolution may be different from the second resolution. For example, the first resolution may be higher than the second resolution (e.g., the first resolution may be a first content resolution, such as a first content resolution that is the same as a pixel resolution of the video frame, and the second resolution may be a second content resolution that is lower than the first content resolution), and a size of the first one of the plurality of macroblocks may be larger than a size of the second one of the plurality of macroblocks.

Various examples are described herein in which video frames are encoded using resolution information indicating the resolution of content within each video frame. It is also appreciated that the encoding and decoding operations described herein can also be applied to images that are not video frames, and that have content with a variable resolution that varies within the image.

Figure 9:
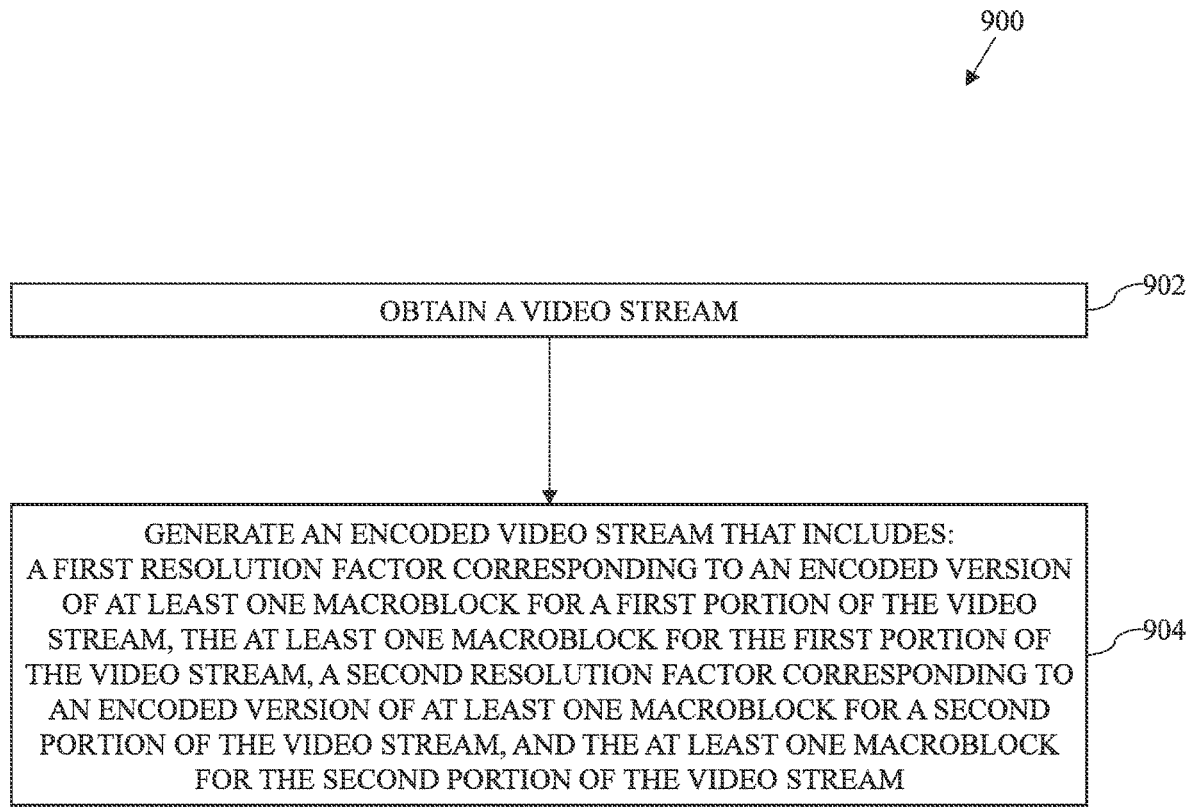
FIG. 9 illustrates a flow diagram of an example process for encoding of video frames according to aspects of the subject technology.

FIG. 9 illustrates a flow diagram of an example process for encoding a video frame according to aspects of the subject technology. The blocks of process 900 are described herein as occurring in serial, or linearly. However, multiple blocks of process 900 may occur in parallel. In addition, the blocks of process 900 need not be performed in the order shown and/or one or more blocks of process 900 need not be performed and/or can be replaced by other operations.

In the example of FIG. 9, at block 902, an electronic device (e.g., electronic device 105) may obtain a video stream. In various use cases, the video stream may include video frames that include content having a variable resolution that varies within one video frame (e.g., as in the examples of FIG. 2, 3, 4, or 5), and/or may include video frames with content having a constant resolution throughout the video frame. For example, in some use cases, an encoder that is capable of resolution-based encoding of video frames that include variable-resolution content may be used to encode one or more video frames having content with a constant resolution throughout the video frame.

At block 904, the electronic device (e.g., using an encoder such as encoder 600) may generate an encoded video stream. The encoded video stream may include a first resolution factor corresponding to an encoded version of at least one macroblock for a first portion of the video stream (e.g., a first video frame, or a first portion of one video frame such as a portion 200, a portion 306, an equatorial portion 400, or a central portion 500 as described herein), the at least one macroblock for the first portion of the video stream, a second resolution factor corresponding to an encoded version of at least one macroblock for a second portion of the video stream (e.g., a second video frame, or a second portion of the one video frame such as a portion 202, a portion 204, a portion 304, a pole portion 402, a portion 502, a portion 504, or a portion 506 as described herein), and the at least one macroblock for the second portion of the video stream. In one or more implementations, the encoded video stream may be a resolution-based encoded video stream, as described herein. In one or more implementations, the encoded video stream may include one or more additional resolution factors corresponding to one or more additional macroblocks for one or more additional portions of the video stream. In one or more implementations, the first portion of the video stream and the second portion of the video stream are different portions of one video frame. In one or more other implementations, the first portion of the video stream and the second portion of the video stream correspond to a first and second video frame respectively.

In one or more implementations, the process 900 may also include (e.g., as part of generating the encoded video stream) obtaining the first resolution factor for first content of the first portion of the video stream, determining a first macroblock size of the at least one macroblock for the first portion of the video stream based on the first resolution factor, obtaining the second resolution factor for second content of a second portion of the video stream, and determining a second macroblock size, different from the first macroblock size, of the at least one macroblock for the second portion of the video stream based on the second resolution factor. It is appreciated that the operations described above in connection with blocks 902 and 904 of FIG. 9 can be repeated for multiple additional portions of a video frame, for multiple additional video frames within the video stream, and/or for additional video streams to generate the encoded video stream and/or other encoded video streams. In one or more implementations, the encoded video stream may be stored and/or transmitted to another electronic device.

As described above, aspects of the subject technology may include the collection and transfer of data. The present disclosure contemplates that in some instances, this collected data may include personal information data that uniquely identifies or can be used to identify a specific person. Such personal information data can include images, sensor data, gaze information, motion information, environment information, demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used in encoding and/or decoding foveated video frames. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of encoding and/or decoding foveated video frames, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 10:
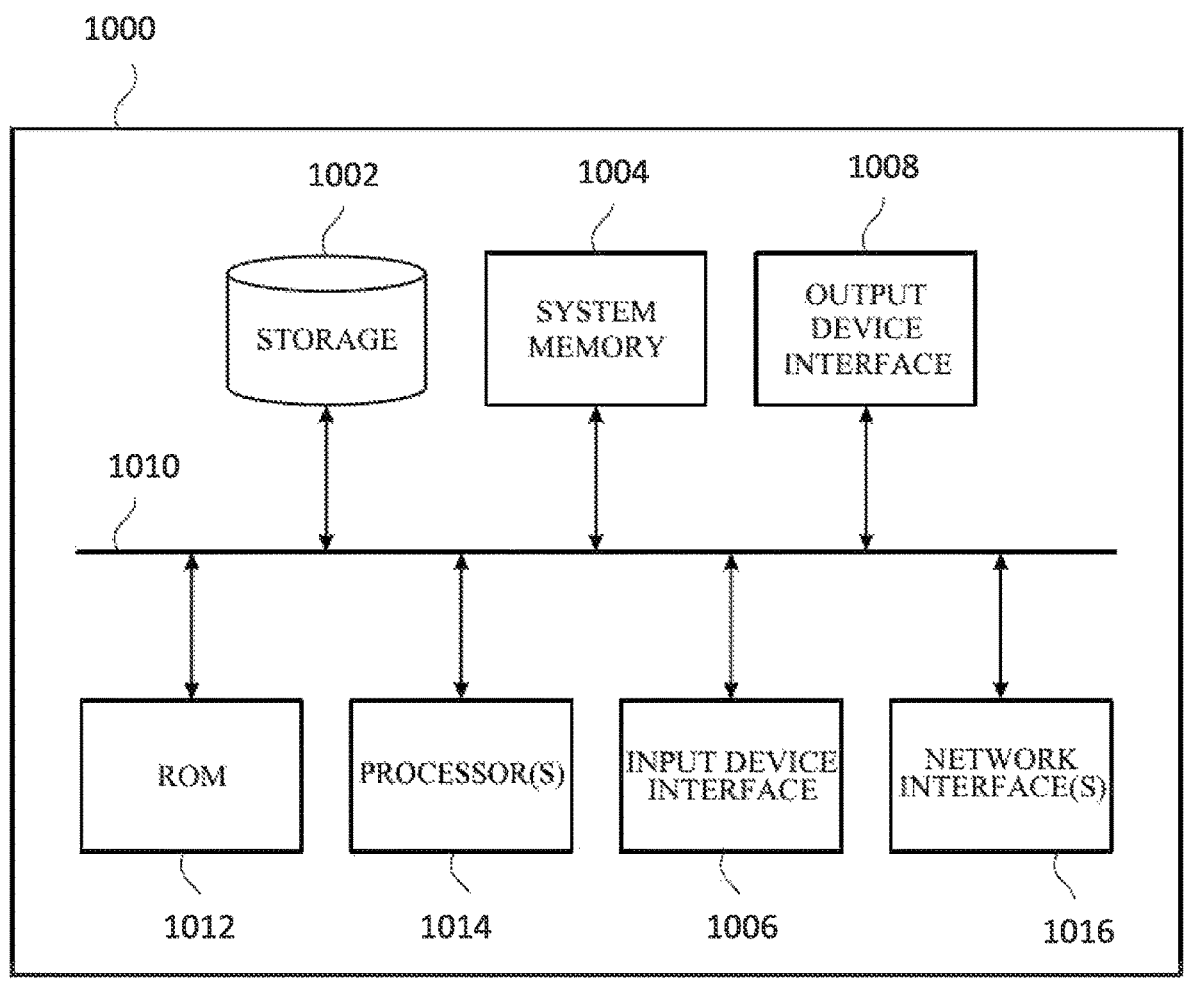
FIG. 10 illustrates an example computing device with which aspects of the subject technology may be implemented.

FIG. 10 illustrates an example computing device with which aspects of the subject technology may be implemented in accordance with one or more implementations. The computing device 1000 can be, and/or can be a part of, any computing device or server for generating the features and processes described above, including but not limited to a laptop computer, a smartphone, a tablet device, a wearable device such as a goggles or glasses, and the like. The computing device 1000 may include various types of computer readable media and interfaces for various other types of computer readable media. The computing device 1000 includes a permanent storage device 1002, a system memory 1004 (and/or buffer), an input device interface 1006, an output device interface 1008, a bus 1010, a ROM 1012, one or more processing unit(s) 1014, one or more network interface(s) 1016, and/or subsets and variations thereof.

The bus 1010 collectively represents all system, peripheral, and chipset buses that communicatively connect the numerous internal devices of the computing device 1000. In one or more implementations, the bus 1010 communicatively connects the one or more processing unit(s) 1014 with the ROM 1012, the system memory 1004, and the permanent storage device 1002. From these various memory units, the one or more processing unit(s) 1014 retrieves instructions to execute and data to process in order to execute the processes of the subject disclosure. The one or more processing unit(s) 1014 can be a single processor or a multi-core processor in different implementations.

The ROM 1012 stores static data and instructions that are needed by the one or more processing unit(s) 1014 and other modules of the computing device 1000. The permanent storage device 1002, on the other hand, may be a read-and-write memory device. The permanent storage device 1002 may be a non-volatile memory unit that stores instructions and data even when the computing device 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1014 may need at runtime. In one or more implementations, the processes of the subject disclosure are stored in the system memory 1004, the permanent storage device 1002, and/or the ROM 1012. From these various memory units, the one or more processing unit(s) 1014 retrieves instructions to execute and data to process in order to execute the processes of one or more implementations.

The bus 1010 also connects to the input and output device interfaces 1006 and 1008. The input device interface 1006 enables a user to communicate information and select commands to the computing device 1000. Input devices that may be used with the input device interface 1006 may include, for example, alphanumeric keyboards and pointing devices (also called "cursor control devices"). The output device interface 1008 may enable, for example, the display of images generated by computing device 1000. Output devices that may be used with the output device interface 1008 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1010 also couples the computing device 1000 to one or more networks and/or to one or more network nodes through the one or more network interface(s) 1016. In this manner, the computing device 1000 can be a part of a network of computers (such as a LAN, a wide area network ("WAN"), or an Intranet, or a network of networks, such as the Internet. Any or all components of the computing device 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   obtaining a video frame having content with a variable resolution that varies within the video frame;
   obtaining resolution information for the content of the video frame;
   providing the video frame and the resolution information as inputs to an encoder; and
   encoding the video frame with the encoder based on the resolution information, at least in part by determining a prediction mode for at least one macroblock for a first portion of the video frame based on the resolution information.

2. The method of claim 1, wherein the resolution information comprises a resolution map for the content of the video frame.

3. The method of claim 1, wherein the resolution information comprises a projection indicator for the content of the video frame.

4. The method of claim 3, wherein encoding the video frame with the encoder based on the resolution information comprises determining, by the encoder, a plurality of resolution factors for the content of a respective plurality of portions of the video frame based on the projection indicator and based on previously stored projection information for the projection indicator.

5. The method of claim 1, wherein encoding the video frame with the encoder based on the resolution information comprises:
   obtaining a first resolution factor for the content of a first portion of the video frame based on the resolution information;
   determining a first macroblock size of at least one macroblock for the first portion of the video frame based on the first resolution factor;
   obtaining a second resolution factor for the content of a second portion of the video frame based on the resolution information; and
   determining a second macroblock size, different from the first macroblock size, of at least one macroblock for the second portion of the video frame based on the second resolution factor.

6. The method of claim 5, wherein encoding the video frame with the encoder based on the resolution information further comprises generating a resolution-based encoded video stream that includes the first resolution factor, an encoded version of the at least one macroblock for the first portion of the video frame, the second resolution factor, and an encoded version of the at least one macroblock for the second portion of the video frame.

7. The method of claim 5, wherein encoding the video frame with the encoder based on the resolution information further comprises:
dividing the at least one macroblock for the first portion of the video frame based on the resolution information.

8. The method of claim 1, wherein the video frame comprises a gaze-based foveated video frame, and wherein the determining the prediction mode comprises selecting an intra-frame prediction mode or an inter-frame prediction mode for the at least one macroblock for the first portion of the video frame.

9. The method of claim 1, wherein the video frame comprises one of a foveated video frame, an equirectangular projection video frame, and a fish-eye projection video frame.

10. A method, comprising:
receiving, at an electronic device, a resolution-based encoded video stream comprising a plurality of encoded macroblocks for a video frame and a plurality of respective resolution factors for the plurality of encoded macroblocks, each of the plurality of encoded macroblocks having been encoded based at least in part on a prediction mode selected based on resolution information for a portion of the video frame; and
decoding the resolution-based encoded video stream, with a decoder of the electronic device using the plurality of respective resolution factors received in the resolution-based encoded video stream, to generate the video frame.

11. The method of claim 10, wherein decoding the resolution-based encoded video stream comprises:
decoding a first one of the plurality of encoded macroblocks using a first respective one of the plurality of respective resolution factors to generate a first portion of the video frame; and
decoding a second one of the plurality of encoded macroblocks using a second respective one of the plurality of respective resolution factors to generate a second portion of the video frame.

12. The method of claim 11, wherein the first portion of the video frame includes first content having a first resolution corresponding to the first respective one of the plurality of respective resolution factors, the second portion of the video frame has second content having a second resolution corresponding to the second one respective one of the plurality of respective resolution factors, and the first resolution is different from the second resolution.

13. The method of claim 12, wherein the first resolution is higher than the second resolution, and wherein a size, after decoding, of the first one of the plurality of encoded macroblocks is larger than a size, after decoding, of the second one of the plurality of encoded macroblocks.

14. The method of claim 10, wherein the video frame comprises one of a foveated video frame, an equirectangular projection video frame, and a fish-eye projection video frame.

15. An electronic device, comprising:
a memory; and
one or more processors configured to:
obtain a video frame having content with a variable resolution that varies within the video frame;
obtain resolution information for the video frame;
provide the video frame and the resolution information as inputs to an encoder; and
encode the video frame with the encoder based on the resolution information, at least in part by:
determining, based on the resolution information, an initial macroblock size, of a macroblock size for the at least one macroblock to obtain a final macroblock size for the at least one macroblock, and
including the at least one macroblock having the final macroblock size in an encoded video stream.

16. The electronic device of claim 15, wherein the one or more processors are configured to encode the video frame with the encoder based on the resolution information, at least in part, by:
obtaining a first resolution factor for the content of a first portion of the video frame based on the resolution information;
determining a first macroblock size of at least one macroblock for the first portion of the video frame based on the first resolution factor;
obtaining a second resolution factor for the content of a second portion of the video frame based on the resolution information; and
determining a second macroblock size, different from the first macroblock size, of at least one macroblock for the second portion of the video frame based on the second resolution factor.

17. The electronic device of claim 16, wherein the one or more processors are further configured to encode the video frame with the encoder based on the resolution information, at least in part, by generating a resolution-based encoded video stream that includes the first resolution factor, an encoded version of the at least one macroblock for the first portion of the video frame, the second resolution factor, and an encoded version of the at least one macroblock for the second portion of the video frame.

18. The electronic device of claim 16, wherein the one or more processors are further configured to encode the video frame with the encoder based on the resolution information, at least in part, by:
dividing the at least one macroblock for the first portion of the video frame based on the resolution information.

19. The electronic device of claim 16, wherein the one or more processors are further configured to encode the video frame with the encoder based on the resolution information, at least in part, by:
determining a prediction mode for the at least one macroblock for the first portion of the video frame based on the resolution information.

20. The electronic device of claim 15, wherein the one or more processors are configured to encode the video frame with the encoder based on the resolution information by performing a power efficient optimization of a macroblock size, a macroblock division, and a prediction mode selection using the resolution information.

21. The electronic device of claim 15, wherein the variable resolution of the content of the video frame is different from a variable resolution of content of a temporally adjacent video frame, and wherein the one or more processors are configured to encode the video frame with the encoder based on the resolution information by scaling at least one macroblock for the video frame using the resolution information, for comparison of the scaled macroblock with a reference block.

22. A method, comprising:
obtaining a video stream and a projection indicator for the video stream; and
generating, based on the projection indicator, an encoded video stream that includes:

a first resolution factor corresponding to an encoded version of at least one macroblock for a first portion of the video stream, the at least one macroblock for the first portion of the video stream, a second resolution factor corresponding to an encoded version of at least one macroblock for a second portion of the video stream, and the at least one macroblock for the second portion of the video stream.

23. The method of claim 22, wherein the first portion of the video stream and the second portion of the video stream:

are different portions of one video frame; or correspond to a first and second video frame respectively.

24. The method of claim 23, further comprising:

obtaining the first resolution factor for first content of the first portion of the video stream;

determining a first macroblock size of the at least one macroblock for the first portion of the video stream based on the first resolution factor;

obtaining the second resolution factor for second content of a second portion of the video stream; and determining a second macroblock size, different from the first macroblock size, of the at least one macroblock for the second portion of the video stream based on the second resolution factor.

25. The method of claim 24, wherein the one video frame includes content with a variable resolution that varies within the one video frame.

26. The method of claim 1, wherein encoding the video frame with the encoder based on the resolution information comprises:

determining, based on the resolution information, an initial macroblock size for at least one macroblock for the video frame, performing, based on the initial macroblock size, an optimization of a macroblock size for the at least one macroblock to obtain a final macroblock size for the at least one macroblock, and including the at least one macroblock having the final macroblock size in an encoded video stream.

\* \* \* \* \*